United States Patent
Ahola

[11] Patent Number: 6,084,200
[45] Date of Patent: Jul. 4, 2000

[54] PLASMA TORCH HAVING A PIVOTABLE ELECTRODE

[75] Inventor: Tom Ahola, Klaukkala, Finland

[73] Assignee: Plasma Modules Oy, Helsinki, Finland

[21] Appl. No.: 09/297,191
[22] PCT Filed: Oct. 13, 1997
[86] PCT No.: PCT/FI97/00622
   § 371 Date: May 12, 1999
   § 102(e) Date: May 12, 1999
[87] PCT Pub. No.: WO98/18591
   PCT Pub. Date: May 7, 1998

[30] Foreign Application Priority Data

Oct. 28, 1996 [FI] Finland ................. 964347

[51] Int. Cl.⁷ ........................................ B23K 10/00
[52] U.S. Cl. ......................... 219/121.52; 219/121.48; 219/75; 219/121.36
[58] Field of Search ............ 219/74, 75, 121.48, 219/121.52, 121.5, 119, 121.39, 121.36

[56] References Cited

U.S. PATENT DOCUMENTS

| | | | |
|---|---|---|---|
| 3,794,806 | 2/1974 | Klasson ................. | 219/75 |
| 3,813,510 | 5/1974 | Hatch . | |
| 4,203,022 | 5/1980 | Couch, Jr. et al. . | |
| 4,567,346 | 1/1986 | Marhic . | |
| 4,777,342 | 10/1988 | Hafner ................. | 219/121.39 |
| 4,788,401 | 11/1988 | Kleppen ................. | 219/75 |
| 4,791,268 | 12/1988 | Sanders et al. . | |
| 4,896,016 | 1/1990 | Broberg et al. . | |
| 5,208,441 | 5/1993 | Broberg . | |
| 5,208,442 | 5/1993 | Ahola et al. ................. | 219/121.52 |

FOREIGN PATENT DOCUMENTS 0640426 3/1995 European Pat. Off. .

*Primary Examiner*—Mark Paschall
*Attorney, Agent, or Firm*—Birch, Stewart, Kolasch & Birch, LLP

[57] ABSTRACT

The invention relates to a plasma torch in which the position of the electrode (4) with respect to the orifice (11) of the plasma nozzle (5) can be adjusted. The electrode (4) is mounted on the body (3) of the torch via a ball-and-socket joint (14), whereby the electrode (4) can be rotated supported by the joint (14) thus facilitating the alignment of its tip in the center of the orifice (11) of the plasma nozzle (5). The ball part (14) of the joint is clamped in the socket (15) by means of a tightening bushing (16). The plasma torch electrode (4) is fixed to the pivotal joint (14) by way of a longitudinally adjustable assembly (12, 17, 20, 25), whereby the tip of the electrode (4) can be moved with the help of the adjustment assembly (12, 17, 20, 25) to touch the nozzle (5) thus effecting the alignment of the electrode in the pivotal support of the ball-and-socket joint (14) and under the guidance of the sliding tip of the electrode (4) to the center of the nozzle orifice (11).

16 Claims, 2 Drawing Sheets

PLASMA TORCH HAVING A PIVOTABLE ELECTRODE

This application is the national phase under 35 U.S.C. §371 of PCT International Application No. PCT/FI97/00622 which has an International filing date of Oct. 13, 1997 which designated the United States of America.

BACKGROUND OF THE INVENTION

1. Field of the Invention

The present invention relates to a plasma torch and a method for adjusting the electrode position in the torch.

2. Description of the Related Art

In a plasma torch, the main arc used in the welding process is struck between the torch center electrode and the work. The nozzle section of the torch is comprised of two concentric chambers. The inner chamber houses a tungsten electrode, and the chamber lower end is provided with an orifice which is concentrically aligned about the electrode tip. The plasma gas is fed into this chamber. The inner chamber is surrounded by another chamber, which exits concentrically surrounding the orifice of the inner chamber. The inert gas forming a protective gas shield about the arc is fed into this outer chamber.

Since the transferred arc of the plasma torch needs to be struck in a gas atmosphere between the work and the center electrode, the plasma gas must be ionized prior to the initiation of the main arc to make the gas capable of supporting electrical conduction. Ionization is effected by means of a pilot arc struck between the center electrode and the nozzle piece forming the inner chamber. The pilot arc ionizes the plasma gas, whereby a conductive path of ionized gas is formed between the work and the electrode, thus facilitating the initiation of the main arc. The pilot arc can be struck by moving the center electrode to touch the nozzle piece, whereby an electric circuit is established.

The transferred main arc should be maintained between the center electrode and the work only, because the nozzle will be rapidly destroyed if double-striking moves the high-energy main arc to strike between the electrode and the nozzle. Hence, the electrode tip must be aligned precisely to the electrical center of the nozzle orifice. If the nozzle orifice and the electrode tip are fully symmetrical, the electrical center is generally also coincident with the geometrical center of the nozzle.

In a great number of torch constructions intended for manual welding, the electrode position can be altered only by machining the electrode tip, because the electrode is centered in a fixed manner by means of ceramic support pieces fitted in the interior of the nozzle. Such regrinding of the electrode is a slow and time-consuming operation inasmuch as machining tools must be used due to the stringent requirements of a high-precision tip shape.

In large-size mechanically controlled plasma torches used for welding, electrode centering can be made by means of an eccentric mechanism. This kind of torch has a large-diameter nozzle orifice and the main arc is initiated with the help of a high-frequency arc struck in a rotating manner between the center electrode and the surrounding nozzle piece in the annular gap of the nozzle orifice. Centering of the electrode is effected by first initiating the high-frequency arc and then moving the electrode by means of the eccentric mechanism until the arc is seen to rotate symmetrically about the annular gap of the nozzle orifice. However, such a mechanism is excessively robust for manual torches, and therefore, can be used only in torches equipped with high-frequency initiation. As the torch is not gas-tight during the centering of the electrode, this arrangement does not permit adjustment of electrode position when the main arc is running stable.

In U.S. Pat. No. 5,208,442 is disclosed a plasma torch in which the electrode is mounted to the torch body by means of a tightenable ball-and-socket joint, whereby the electrode can be pivotally rotated supported by the joint for the adjustment of the electrode tip position by means of a knob located in the upper section of the torch, after which the electrode may be locked in place by tightening the joint. While this device serves well in manual welding, the welding machinery must be halted in automatic welding when the adjustment of electrode position is necessary. Furthermore, manual control cannot be used for adjusting the plasma jet intensity (jet size) during welding, which results in a work-slowing drawback in certain types of welds. Particularly the start and finishing steps of single-pass through-welded pipe seams and other welds of circular joints may easily cause defects in the weld.

It is an object of the present invention to provide an assembly permitting automatic adjustment of the electrode tip position in a plasma torch when required.

SUMMARY OF THE INVENTION

The goal of the invention is achieved by mounting the center electrode of the torch into its pivotal joint by means of an adjustable assembly permitting the electrode tip to be moved with the help of the mounting assembly into an intimate contact with the nozzle piece, whereby the electrode is pivotally rotated in the joint so as to coincide with the center of the nozzle orifice under the guidance of the electrode tip.

The invention offers significant benefits.

The arrangement according to the invention permits easy centering of the electrode in the orifice of the nozzle piece. The centering step can be performed fully automatically with the help of a controllable electric motor adapted to the body of the torch, whereby the welding equipment control program may be complemented with the electrode adjustment routine, thus relieving the operator from the task of electrode adjustment. The energy density of the plasma arc can be controlled by altering the electrode position thereby permitting a change of the plasma arc from a narrow cutting jet into a wider jet capable of applying the heat of the arc over a wider area. The present method of electrode adjustment can prevent the occurrence of weld defects, e.g., in round-welded pipes and similar joints. The facility of automatic electrode adjustment offers an additional control parameter, which makes the control task of welding easier and allows the use of the method over a wider range of applications.

Since the novel method of electrode adjustment needs no manual operation of the torch, the adjustment can be performed during any step of the work cycle even when the torch is attached to a welding robot or other actuator moving over a large area. By contrast, in manual methods of electrode adjustment, the torch must always be driven to the reach of the operator and the equipment stopped in a safe state. In manually held torches, the present adjustment device can be a separate, electric-powered screwdriver equipped with a simple control for actuating the rotation. Furthermore, the adjustment may also be made manually if the torch is equipped with a relatively accurate scale from which the height position of the electrode can be read. By virtue of one specification of the plasma torch according to the invention, the electrodes and nozzles of the torch are made easily replaceable, which contributes to the variability of the torch to suit different applications.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
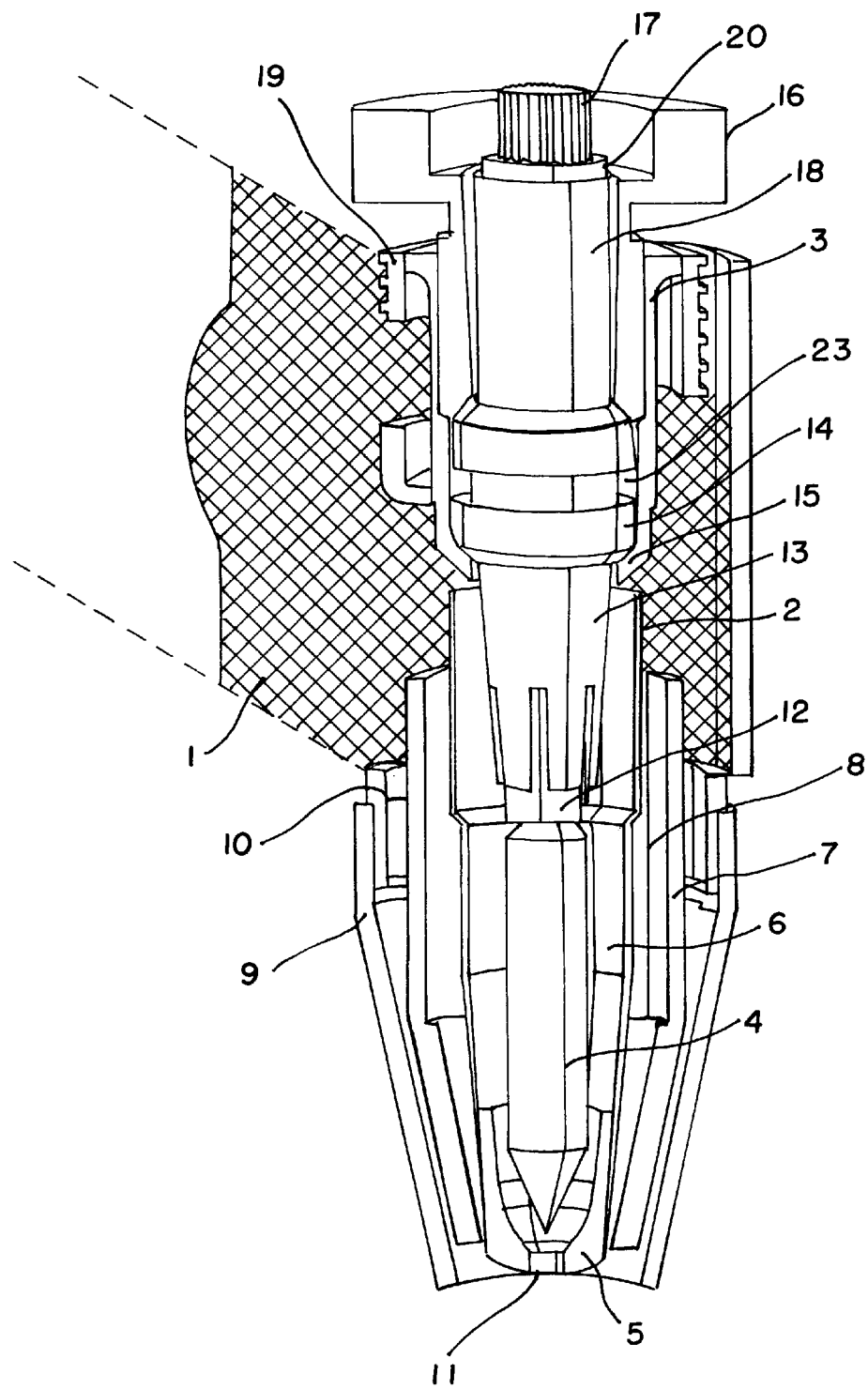
FIG. 1 shows one embodiment of the plasma torch according to the invention.

Referring to FIG. 1, therein is shown the construction of a plasma torch incorporating an embodiment of the electrode centering assembly according to the invention. The cover 1 of the torch body is made from epoxy resin or other electrically insulating material and houses all required electrical, gas and water assemblies. Inside the cover 1 is adapted an upper body piece 3 of the water-cooled torch head housing a socket 15 for the ball piece 14 of the holder of the electrode 4. Under the upper body piece 3 is adapted a water-cooled lower body piece 2 which is electrically insulated from the upper body piece 3. The lower body piece 2 forms a plasma gas chamber 6 about the electrode 4. The plasma gas chamber 6 exits at the lower end of the lower body piece 2 into a replaceable plasma nozzle 5 having a nozzle orifice 11 made thereto. The lower body piece 8 is enclosed by a water jacket 7 forming a water-cooled chamber 8 about the lower body piece. The plasma nozzle 5 and the water jacket 7 are enclosed by a protective gas cover 9 connected to the torch cover 1 by means of a locking sleeve 10.

Figure 2:
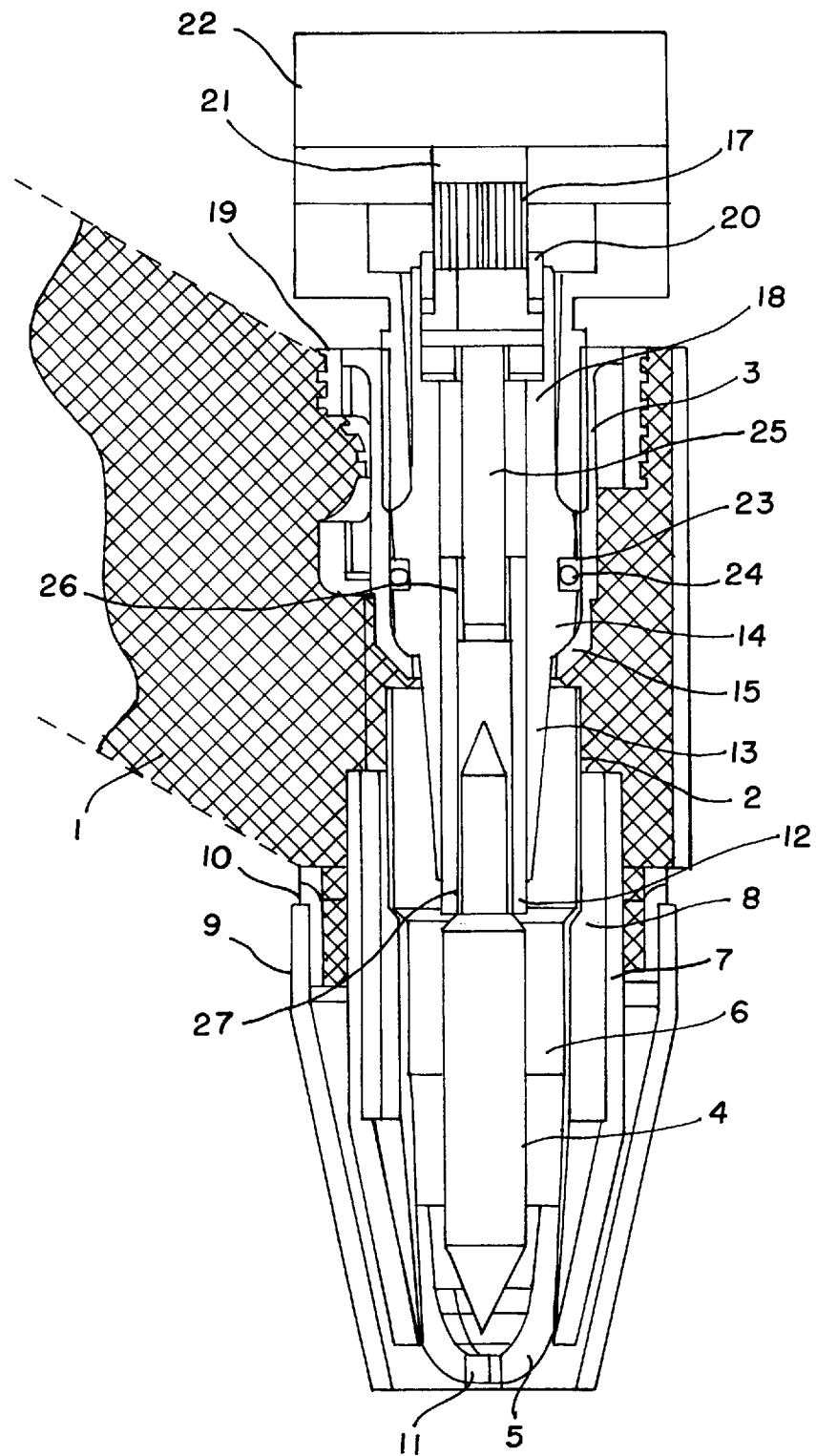
FIG. 2 shows an other embodiment of the plasma torch according to the invention.

The electrode holder 18 is adapted to the torch upper body piece 3 via the ball piece 14. The lower end of the ball piece 14 is supported against the backing surface of a socket 15 mounted in the upper body piece 3 and the upper end of the ball piece rests against the lower end of a tightening bushing 16 which is mounted on threads in the torch upper piece 3. Thus, the rotation of the tightening bushing 16 compresses the ball piece 14 tightly against the backing surface of the socket 15 and permits the adjustment of the force required for moving the ball piece 14. When desired, as shown in FIG. 2 the gas-tightness of the ball piece 14 can be assured by mounting an O-ring 24 in a groove 23. Also the torch upper part 3 is water-cooled by means of a surrounding water jacket 19.

The electrode 4 is fixed by a threaded joint 27 into an electrode fixture 12 which is adapted on the center axis of the electrode holder 18 of a length so as to extend into the interior of the electrode holder 18. The outer surface of the fixture 12 is made hexagonal with a shape which mates with a compatible recess of the electrode holder, thus preventing the electrode fixture 12 from rotating in the electrode holder. The center of the electrode fixture 12 is provided with a threaded bore hole having the replaceable electrode 4 mounted to its lower end and the threaded rod 25 of the control knob 17 of the electrode 4 adapted to its upper end by means of a threaded joint 26. Owing to the threaded fixture of the electrode, a single torch can be used with electrodes of different sizes and plasma nozzles, thus extending the operating range of a single torch over an extended range of applications. The control knob 17 is clamped to the tightening bushing 16 by means of a collet ring 20 so as to permit the rotation of the knob in the bore of the tightening bushing while simultaneously preventing the sliding of the knob in the longitudinal direction in the bore. Thus, by virtue of the hexagonal loose-sliding connection preventing the rotation of the electrode fixture 12 in the electrode holder 18 and owing to the longitudinal clamping of the control knob 17, the rotation of the control knob moves the electrode fixture 12 with the electrode 4 in the longitudinal direction, thus facilitating the adjustment of the distance of the electrode 4 from the plasma nozzle orifice. The threaded rod 25 of the control knob 17 is advantageously attached to the control knob so loosely as to prevent the position of the electrode 4 from changing during the rotation of the control knob. While the rotation of the control knob 17 can be made manually or using a separate electrically driven tool, particularly in automatic welding the arrangement of FIG. 2 is suitable having the control knob 17 driven by an electric motor 22 via a shaft 21.

The centering and position adjustment of the electrode occurs as follows. Prior to commencing a work cycle, the electrode 4 is rotated down to touch the orifice of the plasma nozzle 5. Owing to the precision-machined shapes of the tip shape of the electrode 4 and the orifice of the plasma nozzle 5, the tip of the electrode 4 will be precisely centered in the orifice 11 of the plasma nozzle when lowered into the orifice 11 of the nozzle 5 under the pivotal guidance of the ball-and-socket joint 14 of the electrode holder 18. Simultaneously, the height position of the electrode 4 will be accurately defined and set as the zero reference height of the electrode. Next, the control knob 17 is rotated backward for the number of turns corresponding to the desired withdrawn operating position of the electrode. The distance between the electrode and the nozzle orifice can be computed from overall backward rotation angle and the pitch of the control knob rod threads. The alignment step may advantageously be complemented with the initiation step of the pilot arc at the instant of electrical contact between the electrode and the nozzle orifice.

The above described method offers accurate control of the electrode position. If the pitch of threaded rod which connects the electrode fixture 12 with the control knob 17 is 0.5 mm per turn, a relatively modest positioning accuracy is required from the electric motor rotating the control knob 17. In fact, the positioning accuracy of the electrode is determined by the mechanical backlash of the electrode-moving mechanism, rather than by the positioning accuracy of the electric motors conventionally used today as actuators. Since the practical positioning accuracy needed in the distance adjustment between the electrode and the plasma nozzle is about 0.1 mm, this requirement is readily fulfilled in the embodiment according to the invention. For manual operation of the control knob, a 10-step graduation of the control knob rim is in principle sufficiently accurate for electrode positioning.

Most advantageously, the electrode positioning routine is implemented as a part of the control software of the automatic welding equipment. Then, the routine is first made to control the electric motor so that the electrode is centered in the beginning of the work cycle, with a simultaneous initiation of the pilot arc. Next, the energy density of the plasma arc is controlled to a desired level by moving the electrode backward before commencing welding. During the work cycle, the electrode position and main arc energy density can be altered by virtue of the control program parameters so as to optimize the arc characteristics for optimal performance at the start and end points of weld seams. This possibility facilitates higher quality of seams and extends the applicability of plasma welding, and furthermore, offers a vastly simplified approach over the prior art to the welding certain types of seams.

In addition to those described above, the invention may have alternative embodiments.

The torch construction may be varied widely with regard to its water, gas and electrical assemblies. The essential specification of the invention is that the electrode holder is mounted in the torch body by means of a ball-and-socket joint or other similar union having at least two degrees of freedom permitting the movement of the electrode tip during its position adjustment. While mounting methods different from a threaded fixture of the electrode are feasible, the good heat conduction capability and reliable function of a threaded electrode fixture make it a preferred alternative. Furthermore, the fixture of the electrode holder must have such a structure that prevents the fixture from rotating about its longitudinal axis. Herein, a hexagonal shape is advantageous without excluding other possible constructions. The electrode with its fixture may also be made into a single element, but the cost of electrodes will then increase unnecessarily. The mating treads of the electrode fixture and the rod of its adjustment assembly can be made on reversed surfaces so that fixture is provided with an outer thread and the adjustment assembly is equipped with a bushing having an inner thread. Also the control knob and the threaded part can be machined into a single piece, or alternatively, fixed permanently to each other, but then the torque applied on the adjustment assembly may cause shifting of the electrode tip under some situations.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A plasma torch comprising:
   a cover with body pieces adapted therein;
   an electrode and, attached to one of said body pieces, a plasma nozzle having therein an orifice for the exit of the plasma jet;
   an electrode holder to which the electrode is attached and which holder is supported by one of the body pieces via a joint that has at least two degrees of freedom;
   an adjustment assembly disposed essentially along a longitudinal axis of the electrode holder, the assembly including a control knob and a threaded part to which the electrode can be fixed, and means for clamping said assembly in place to a desired position along said longitudinal axis; and
   means for preventing the electrode from rotating about said longitudinal axis.

2. A plasma torch as defined in claim 1, further comprising an electrode fixture disposed essentially along the longitudinal axis of said electrode holder, said fixture including a first threaded section for fixing said electrode and a second threaded section for mounting said fixture to the threaded part of said adjustment assembly.

3. A torch as defined in claim 2, wherein a cross section of said electrode fixture has a hexagonal shape and the center of said electrode holder is provided with a center hole of compatible shape, whereby the cross-sectional shape of said electrode fixture clamps said electrode fixture with the electrode and prevents rotation of said electrode about its longitudinal axis with respect to the electrode fixture.

4. A plasma torch as defined in claim 1, wherein said adjustment assembly is operatively connected to a controllable electric motor.

5. A plasma torch as defined in claim 1, wherein said control knob is connected to its threaded member by means of a loose-sliding joint.

6. A method of adjusting an electrode position in a plasma torch, comprising:
   advancing an electrode through a plasma torch until the electrode contacts a nozzle of the plasma torch;
   using the point at which the electrode contacts the nozzle as a reference point for the position of the electrode along an axial extent of the torch;
   determining an amount of rotation for a control knob of the plasma torch, the amount of rotation being determined as a function of the pitch of a threaded connection between the electrode and the control knob of the plasma torch, and as a function of a desired distance of the electrode from the nozzle; and
   after the electrode contacts the nozzle, rotating the control knob of the torch in accordance with the determined amount of rotation, the control knob being rotated in a direction which advances the electrode away from the nozzle, wherein the rotation of the control knob effects advancement of the electrode said desired distance away from the nozzle.

7. The method of claim 6, further comprising adjusting the position of the electrode within the torch during welding.

8. The method of claim 6, further comprising initiating a spark by touching the plasma nozzle to the electrode.

9. The method of claim 6, wherein the electrode is supported in an electrode holder by an electrode fixture, such that when the electrode is advanced through the plasma torch, the electrode remains substantially nonrotatable with respect to the electrode holder.

10. The method of claim 9, wherein the electrode fixture includes at least one flat exterior surface, the at least one flat exterior surface contacting a corresponding flat surface of the electrode holder, the step of advancing the electrode through the plasma torch including the step of passing the flat surfaces over one another.

11. The method of claim 6, wherein the step of rotating the control knob includes the step of rotating the control knob with an electric motor that is operatively coupled to the control knob.

12. The method of claim 6, wherein the step of advancing the electrode until it contacts the nozzle includes the step of centering the electrode within an orifice of the nozzle.

13. The plasma torch of claim 1, wherein the means for preventing the electrode from rotating about said longitudinal axis includes a flat surface on said electrode holder which is engageable with a flat surface of an electrode fixture, the electrode fixture supporting the electrode in the electrode holder.

14. A plasma torch comprising:

a cover, the cover including a body piece;

an electrode holder supported within the body piece of the cover by a pivotable joint;

an electrode fixture having an end supported by the electrode holder, and a second end connected to an electrode, the electrode extending along a longitudinal axis of the torch;

a plasma nozzle disposed at a distal end of the plasma torch;

a clamping device, the clamping device exerting a clamping force on the pivotable joint so that pivoting motion is restricted;

a control knob, the control knob being disposed at one end of the electrode holder; and a threaded rod, the threaded rod being threadedly engaged with the electrode fixture, rotation of the control knob serving to advance the electrode along the longitudinal axis of the plasma torch, wherein the electrode fixture has a noncircular exterior cross-section, and the electrode holder has a noncircular interior cross-section, these cross sections cooperating to prevent rotation of the electrode about the longitudinal axis of the torch.

15. The plasma torch of claim 14, wherein the pivotable joint includes:

a ball piece of the electrode holder, the ball piece having at least one curved surface; and a socket portion of the body piece of the holder, the socket portion having a concave portion which cooperates with the curved surface of the ball piece to allow pivotable motion of the electrode holder within the plasma torch.

16. The plasma torch of claim 14, wherein the electrode fixture has a hexagonal exterior cross-section, and the electrode holder has a hexagonal interior cross-section, the exterior of the electrode fixture being engaged with an interior surface of the electrode holder.

* * * * *